United States Patent [19]

Wesseltoft

[11] 4,079,781
[45] Mar. 21, 1978

[54] RADIANT HEATER

[75] Inventor: Per Wesseltoft, Svelvik, Norway

[73] Assignee: Hjalmar AASS A/S, Oslo, Norway

[21] Appl. No.: 676,597

[22] Filed: Apr. 13, 1976

[30] Foreign Application Priority Data

Apr. 18, 1975 Norway .................................. 751405

[51] Int. Cl.² ........................... F28F 1/04; F28F 1/20; F28F 1/32
[52] U.S. Cl. ................... 165/76; 29/157.3 C; 165/171; 228/173 A
[58] Field of Search ............ 165/171, 76, 49; 29/157.3 C, 727; 228/173 A

[56] References Cited

U.S. PATENT DOCUMENTS

| 2,558,345 | 6/1951 | Dickman | 165/171 X |
| 2,594,232 | 4/1952 | Stockstill | 165/171 |
| 2,734,259 | 2/1956 | Beck | 29/157.3 C |
| 2,823,903 | 2/1958 | Collins | 165/171 X |
| 3,120,869 | 2/1964 | Carpenter | 165/171 |
| 3,224,503 | 12/1965 | Konanz | 165/171 |
| 3,799,257 | 3/1974 | De Clercq | 165/171 |
| 3,828,846 | 8/1974 | Van Dijk | 165/171 X |
| 3,926,358 | 12/1975 | Hester | 29/157.3 C |
| 4,011,856 | 3/1977 | Gallagher | 165/171 |

FOREIGN PATENT DOCUMENTS

| 1,359,891 | 3/1964 | France | 165/171 |
| 1,007,540 | 5/1952 | France | 165/49 |

Primary Examiner—Charles J. Myhre
Assistant Examiner—Sheldon Richter
Attorney, Agent, or Firm—Ladas, Parry, Von Gehr, Goldsmith & Deschamps

[57] ABSTRACT

Heat transfer element, in particular radiant heater, comprising tubes for a circulating fluid, such as water, oil or vapor, and radiation panels formed with profile portions adapted to be mounted in good thermal contact with the tube surface, the tubes having a polygonal cross-section of which two adjacent sides are adapted to each engage one plane surface of the profile portion being formed in a single or in two contiguous radiation panels, and that the plane surfaces of the profile portion are pressed elastically resiliently against said adjacent sides of the tube.

5 Claims, 2 Drawing Figures

RADIANT HEATER

This invention relates to radiant heating systems of the type comprising heating tubes for circulating hot water, oil or vapour, and radiation panels formed with profile portions adapted to be mounted in good thermal contact with the heating tube surface. Such radiant heating installations are in particular, but not exclusively, provided as ceiling heater system in large rooms such as industrial halls etc.

A substantial problem in connection with such installations is due to the necessary heat transfer between each heating tube and the associated radiation panel or panels. A good heat transfer here has decisive significance for the efficiency of the plant. At the same time there is an important requirement to such structures that the mounting thereof can be done in a simple way without any need for using special tools or machines for the assembly of radiation panels and heating tubes.

A particular consideration of significance to the above heat transfer and mounting problems has to do with the dimensional tolerances which occur in the tube qualities being employed in these radiant heating plants. The diameter or cross-sectional dimension of such tubes usually are found to be within such wide tolerances that an accurate fit to cooperating profile portions being formed in the radiation panel, is not possible. The result of such inaccuracies is a poor heat transfer.

According to the present invention the problems discussed here are to a substantial degree solved thereby that there is used heating tubes having a polygonal cross-section with two adjacent sides being adapted to engage a respective plane surface of a profile portion formed in a single or in two adjacent radiation panels, and that the plane surfaces of the profile portion are pressed with elastic resilience against said adjacent sides of the heating tube.

According to a preferred embodiment of the arrangement according to the invention, each radiation panel is formed with at least one profile portion having a V-shaped cross-section and the angle between the plane surfaces of the profile portion in the non-mounted condition of the radiation panel, is somewhat smaller than the angle between the adjacent sides of the heating tube on which the radiation panel is adapted to be mounted. Preferably the heating tube has a square cross-section whereas the angle between the plane surfaces of the profile portion preferably is a little less than 90°.

When the profile portion and the heating tube are formed with cross-sections as stated here, there is obtained a vary advantageous wedge which results in an intimate and permanently good thermal contact between the surface areas of the heating tube and the profile portions of the radiation panel. Moreover, it will be possible to carry out the assembly in a very simple and safe way.

In the following description the invention shall be explained more in detail with reference to the drawing in which.

Figure 1A:
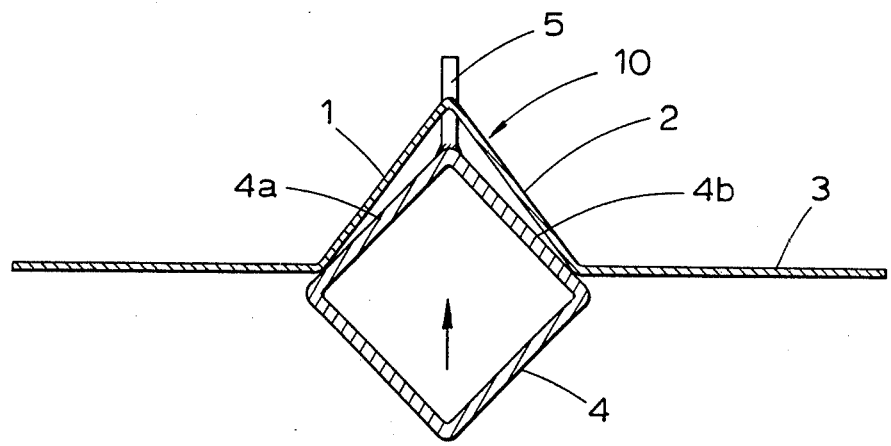
FIG. 1a shows a simplified cross-section of a part of a radiation panel with a profile portion before the mounting of a heating tube therein.
Figure 1B:
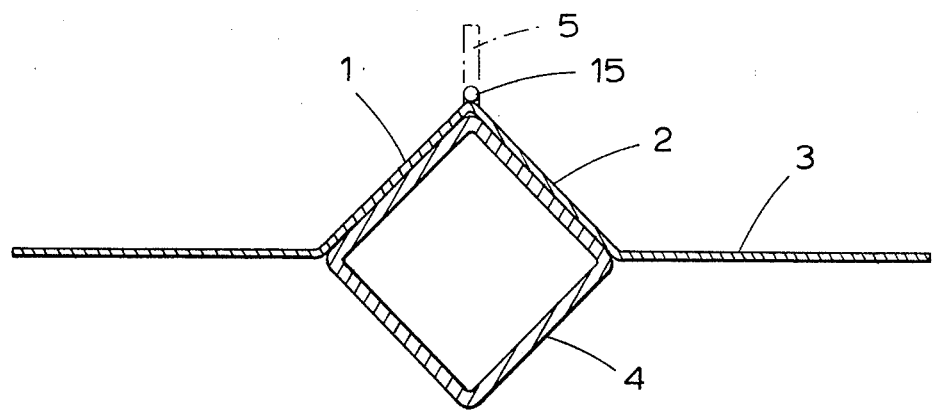
FIG. 1b shows the same components as in FIG. 1a, but in assembled condition.

FIGS. 1a and 1b show a part of a substantially plane radiation panel 3 provided with a profile portion 10 which is adapted to cooperate with a heating tube 4 of square cross-section.

In the non-mounted condition as shown in FIG. 1a, the two plane surfaces 1 and 2 of the profile portion 10 form an angle therebetween of a little less than 90°. By pressing the heating tube 4 into this profile portion 10 in the direction of the arrow in FIG. 1a, the surfaces 1 and 2 will be resiliently urged away from each other whereby the angle between these surfaces will increase to 90° in the condition where the surfaces 1 and 2 are tightly engaging the sides 4a and 4b of the heating tube 4. In this position, therefore, the plane surfaces 1 and 2 of the profile portion will be resiliently pressed against the adjacent sides 4a and 4b of the heating tube 4.

In order to obtain a simple attachment of the heating tube in the mounted condition shown in FIG. 1b, there is provided a pin 5 which is secured to the upper corner of the heating tube 4 and is adapted to pass through a corresponding opening in the profile portion 10 and can thereafter be bent down against the outside thereof, as shown at 15 in FIG. 1b. These bendable pins 5 are preferably made of annealed iron wire which can be upset butt welded on the side of the heating tube in a diagonally outwardly directed position. The only tool being necessary for the assembly by means of the pins 5 is a hammer.

It appears from FIGS. 1a and 1b that the square cross-section of the heating tube has a side edge length approximately equal to the width of the plane surfaces 1, 2 of the profile portion. It is obvious, however, that both the dimensional relationships and the cross-sectional shapes can be subject to many variants which deviate from the specific embodiment shown in FIGS. 1a and 1b. There may be employed not only rectangular heating tube cross-sections, but also triangular or possibly polygonal cross-sections. In all events it will be possible to obtain the particular effect thereby that the plane surfaces of the profile portion are pressed elastically resiliently against adjacent side surfaces of the heating tube. Moreover, it is not absolutely necessary that the profile portion is formed in one and the same radiation panel. Thus, each of two contiguous radiation panels can be formed with one of the two parts of such a profile portion. In this case, it will be practical to form these radiation panels in such a way that they overlap somewhat over the heating tube and advantageously they can be held together by means of pins similar to the pin 5 in FIGS. 1a and 1b.

It will be understood that the radiant heaters according to this invention can also operate as radiant heat absorbers. Thus, they are well suited for solar energy heating systems, in which these radiant heater units when mounted for example on the roof of buildings, will operate in a reverse mode generating vapour or heating water to be circulated into the building for the heating thereof or for other purposes. Moreover these units may be used for cooling and refrigerating purposes, in which the exellent heat transfer properties obtained according to this invention are also advantageous.

I claim:

1. Heat transfer element, in particular radiant heater, comprising tubes for a circulating fluid, such as water, oil or vapour, and radiation panels formed with profile portions adapted to be mounted in good thermal contact with the tube surface, the tubes having a polygonal cross-section of which two adjacent sides are adapted to each engage one plane surface of the profile portion of a radiation panel, and the plane surfaces of the profile portion being pressed elastically resiliently against said adjacent sides of the tube, and wherein each radiation panel is formed with at least one profile portion having a V-shaped cross-section, and the angle between the adjacent sides of the tube on which the radiation panel is mounted being slightly greater than the angle between the plane surfaces of the profile portion when the radiation panel is removed.

2. Element according to claim 1, wherein each radiation panel is formed with at least one profile portion having a V-shaped cross-section, and the angle between the plane surfaces of the profile portion in the non-mounted condition of the radiation panel, is a little less than the angle between the adjacent sides of the tube on which the radiation panel is adapted to be mounted.

3. Element according to claim 1, wherein the tube has a square cross-section and the angle between the plane surfaces of the profile portion is a little less than 90°.

4. Element according to claim 1, wherein the width of the plane surfaces of the profile portion is approximately equal to the width of the respective adjacent sides of the tube.

5. Element according to claim 1, wherein the tube is secured to the radiation panel by means of diagonally outwardly directed bendable pins being preferably made of annealed iron wire which is upset butt welded to the side edge of the tube, and which is adapted to extend through corresponding openings in the profile portion.

* * * * *